US011521308B2

(12) United States Patent
Saleh et al.

(10) Patent No.: US 11,521,308 B2
(45) Date of Patent: Dec. 6, 2022

(54) AMBIENT OCCLUSION USING BOUNDING VOLUME HIERARCHY BOUNDING BOX TESTS

(71) Applicant: Advanced Micro Devices, Inc., Santa Clara, CA (US)

(72) Inventors: Skyler Jonathon Saleh, San Diego, CA (US); Chen Huang, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 299 days.

(21) Appl. No.: 16/864,002

(22) Filed: Apr. 30, 2020

(65) Prior Publication Data
US 2021/0342996 A1 Nov. 4, 2021

(51) Int. Cl.
*G06T 7/00* (2017.01)
*G06T 15/06* (2011.01)
*G06F 9/50* (2006.01)
*G06T 15/00* (2011.01)
*G06T 17/10* (2006.01)
*G06T 15/08* (2011.01)

(52) U.S. Cl.
CPC .......... *G06T 7/0002* (2013.01); *G06F 9/5027* (2013.01); *G06T 15/005* (2013.01); *G06T 15/06* (2013.01); *G06T 15/08* (2013.01); *G06T 17/10* (2013.01)

(58) Field of Classification Search
CPC ..... G06T 7/0002; G06T 15/005; G06T 15/06; G06T 15/08; G06T 17/10; G06F 9/5027
See application file for complete search history.

(56) References Cited

U.S. PATENT DOCUMENTS

| 10,991,147 | B1* | 4/2021 | Bakalash | G06T 13/40 |
| 2010/0289799 | A1* | 11/2010 | Hanika | G06T 17/20 |
| | | | | 345/421 |
| 2017/0249779 | A1* | 8/2017 | Obert | G06T 15/80 |
| 2019/0057539 | A1* | 2/2019 | Stanard | G06T 17/005 |
| 2020/0051318 | A1* | 2/2020 | Muthler | G06T 1/20 |
| 2020/0211260 | A1* | 7/2020 | Xiao | G06T 15/06 |
| 2021/0287429 | A1* | 9/2021 | Vaidyanathan | G06T 1/20 |

OTHER PUBLICATIONS

Pantaleoni, J., et al., "PantaRay: Fast Ray-traced Occlusion Caching of Massive Scenes", ACM Transactions on Graphics, vol. 29, No. 4, Article 37, 10 pgs., Jul. 2010.

Lacewell, D., et al., "Raytracing Prefiltered Occlusion for Aggregate Geometry", downloaded from https://graphics.stanford.edu/~boulos/papers/prefilter_rt08.pdf, 8 pgs. (Retrieved Apr. 29, 2020).

* cited by examiner

*Primary Examiner* — Christopher M Brandt
(74) *Attorney, Agent, or Firm* — Volpe Koenig

(57) ABSTRACT

A technique for performing a ray intersection test, the method comprising: receiving a request for an early termination ray intersection test for a ray; testing the ray against one or more early termination box nodes and one or more normal box nodes of a bounding volume hierarchy; and based on the test of the ray against the one or more early termination box nodes, determining whether to end traversal of the bounding volume hierarchy and determine whether the ray intersects geometry for the purpose of the ray intersection test.

20 Claims, 9 Drawing Sheets

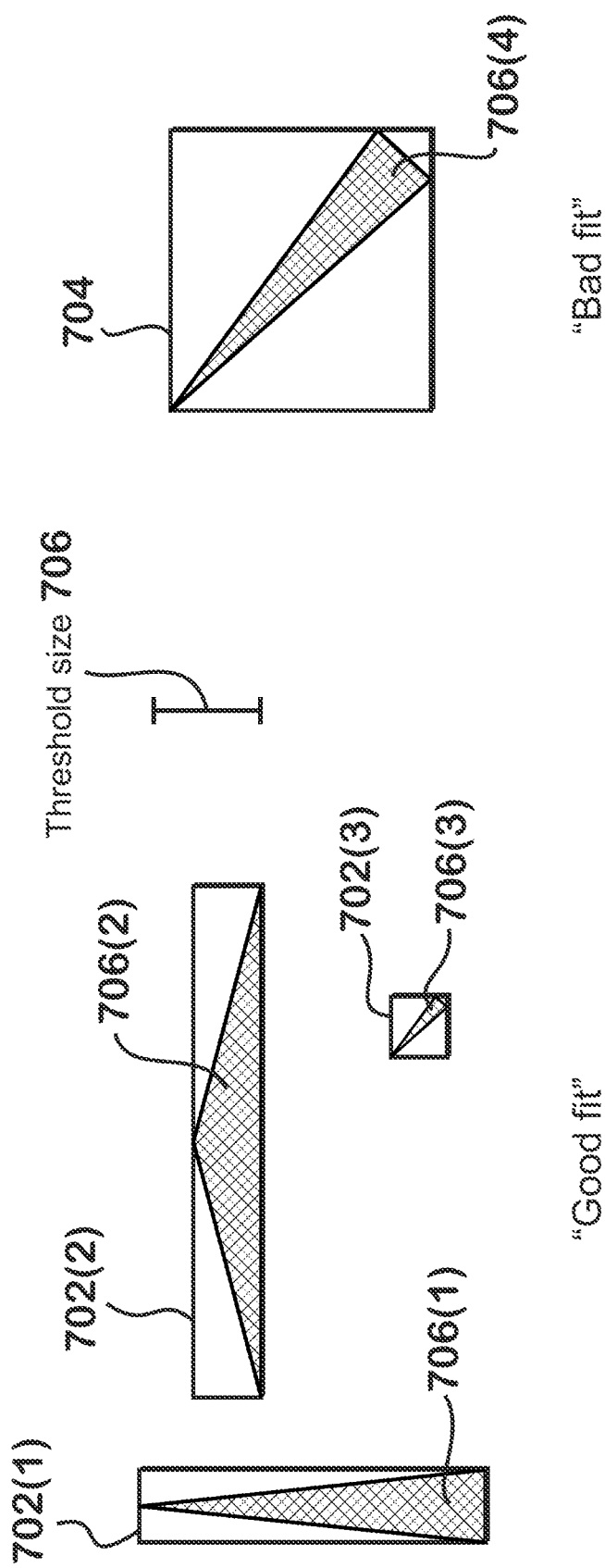

AMBIENT OCCLUSION USING BOUNDING VOLUME HIERARCHY BOUNDING BOX TESTS

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein:

FIG. 7 illustrates an illustration of a bounding box considered a "good fit" and bounding boxes considered a "bad fit," according to examples;

DETAILED DESCRIPTION

A technique for performing a ray intersection test, the method comprising: receiving a request for an early termination ray intersection test for a ray; testing the ray against one or more early termination box nodes and one or more normal box nodes of a bounding volume hierarchy; and based on the test of the ray against the one or more early termination box nodes, determining whether to end traversal of the bounding volume hierarchy and determine whether the ray intersects geometry for the purpose of the ray intersection test.

Figure 1:
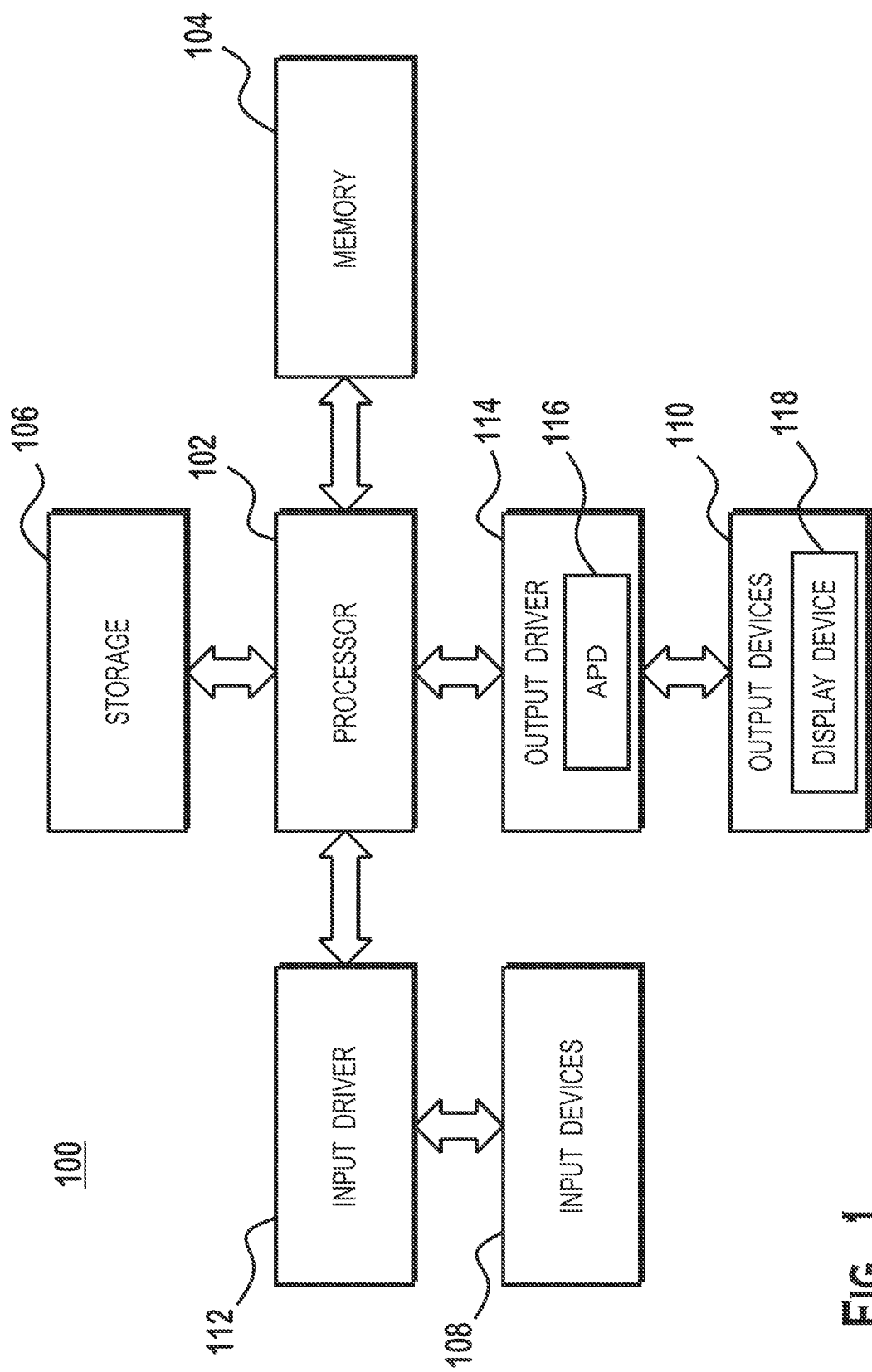
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
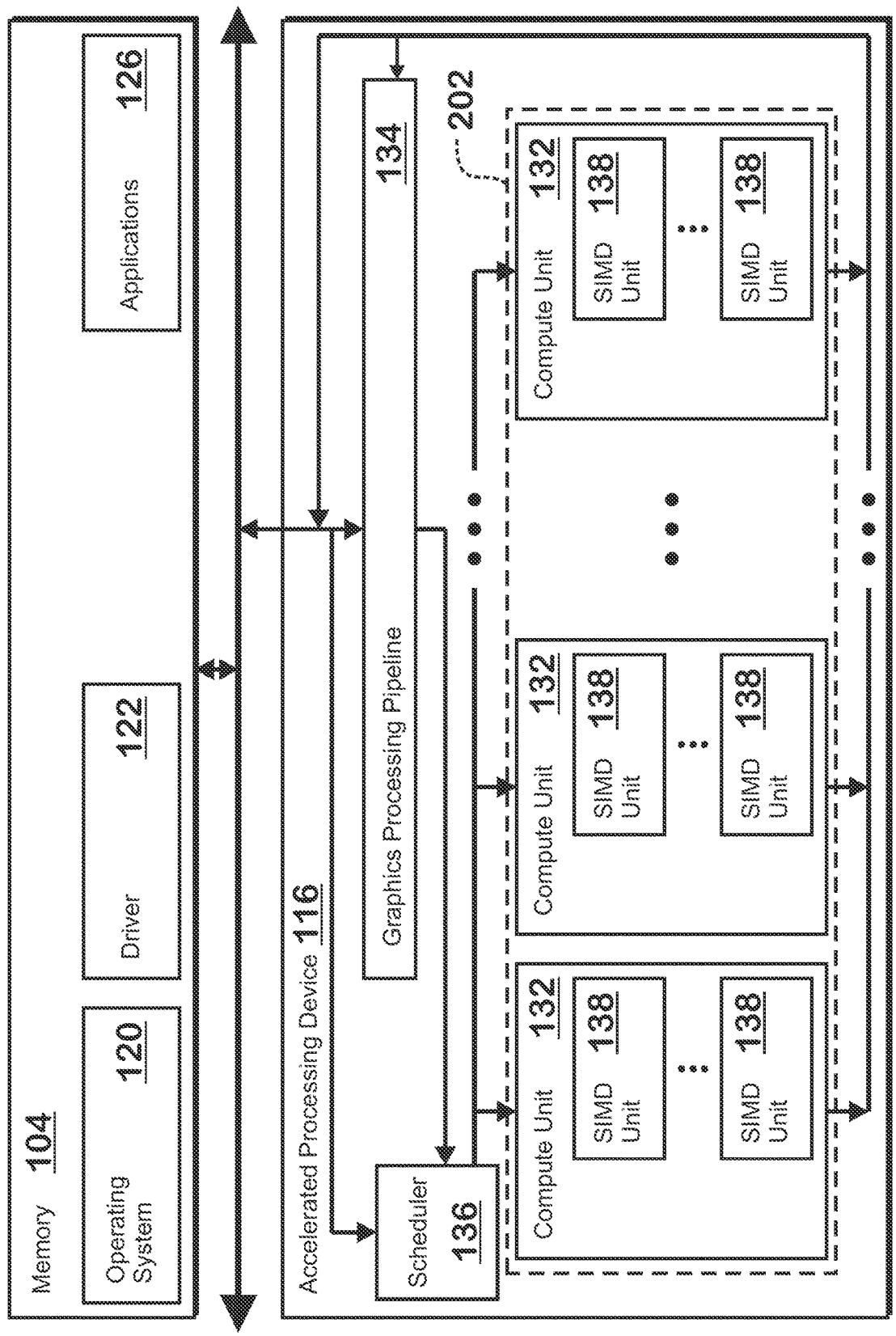
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both paral-lelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
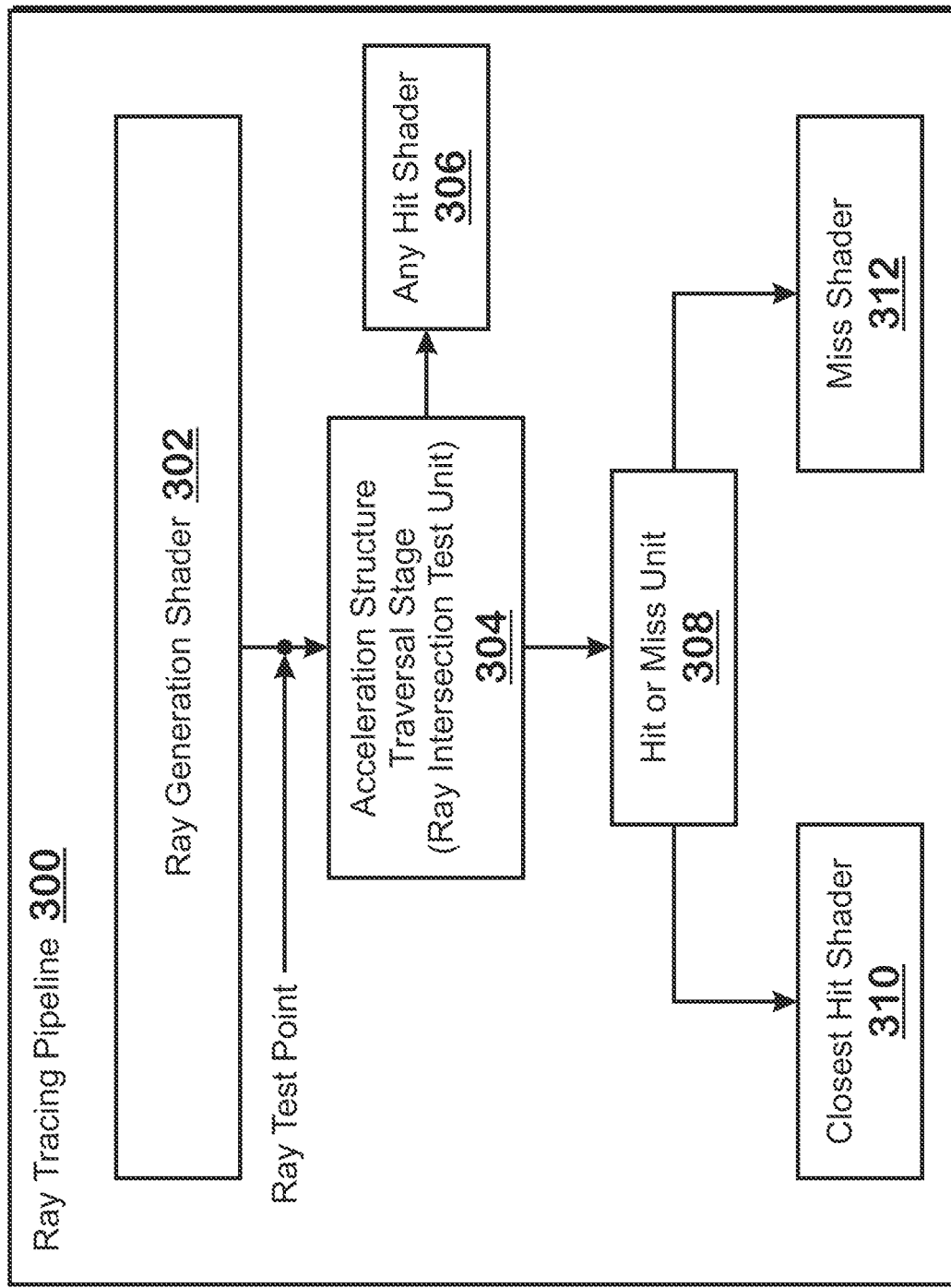
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. In some implementations, a ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). In other implementations, any of the ray generation shader 302, any hit shader 306, closest hit shader 310, and miss shader 312 are implemented as software executed on any type of processor and that performs the operations described herein, circuitry that performs the operations described herein, or a combination of hardware circuitry and software executing on a processor. The acceleration structure traversal stage 304 performs a ray intersection test to determine whether a ray hits a triangle.

The ray tracing pipeline 300 indicates the path through which a ray tracing operation flows. To render a scene using ray tracing, a rendering orchestrator such as a program executing on the processor 102 designates a collection of geometry as a "scene." Various objects in the scene are represented as collections of geometry primitives, which are often triangles, but could be any geometric shape. The term "triangle" when used herein, refers to these geometric primitives that compose a scene. The rendering orchestrator renders the scene by designating a camera position and an image, and requesting rays be traced from the camera through the image. The ray tracing pipeline 300 performs the various operations described herein to determine colors for the rays. Colors are often derived from the triangles that are intersected by the rays. As described elsewhere herein, a ray that hits no triangle invokes a miss shader 312. One possible operation for the miss shader 312 is to color the ray with a color from the "skybox," which is an image that is designated as representing the ambient scene where no geometry is present (for example, a scene with no geometry would render only the skybox). Colors for pixels in the image are determined based on the point of intersection between the ray and the image position. In some examples, after a sufficient number of rays are traced and the pixels of the image have been designated colors, the image is displayed on a screen or is used in some other manner.

In some implementation where the shader stages of the ray tracing pipeline 300 are implemented in software, the various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 is, in various implementations, orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a thing]" is used, this means that the hardware and/or software that implements the ray tracing pipeline 300 does that thing. Although described as executing on the SIMD unit 138 of FIG. 3, it should be understood that in other implementations, other hardware, having or not having SIMD capabilities (e.g., the processor 102), alternatively executes the shader programs of the illustrated ray tracing pipeline 300.

The ray tracing pipeline 300 operates in the following manner. A ray generation shader 302 is performed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers performance of the any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers performance of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the closest hit shader 310 and miss shader 312 may implement a wide variety of techniques for coloring pixels and/or performing other operations. In instances in which these shaders are implemented as programmable shader stages executing shader programs, different shader programs used for the same application are capable of coloring pixels in different ways.

A typical way in which the ray generation shader 302 generates rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing. While it is possible to obtain multiple samples per pixel by casting multiple rays per pixel, techniques are provided herein for obtaining multiple samples per ray so that multiple samples are obtained per pixel by casting only one ray. It is possible to perform such a task multiple times to obtain additional samples per pixel. More specifically, it is possible to cast multiple rays per pixel and to obtain multiple samples per ray such that the total number of samples obtained per pixel is the number of samples per ray multiplied by the number of rays per pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
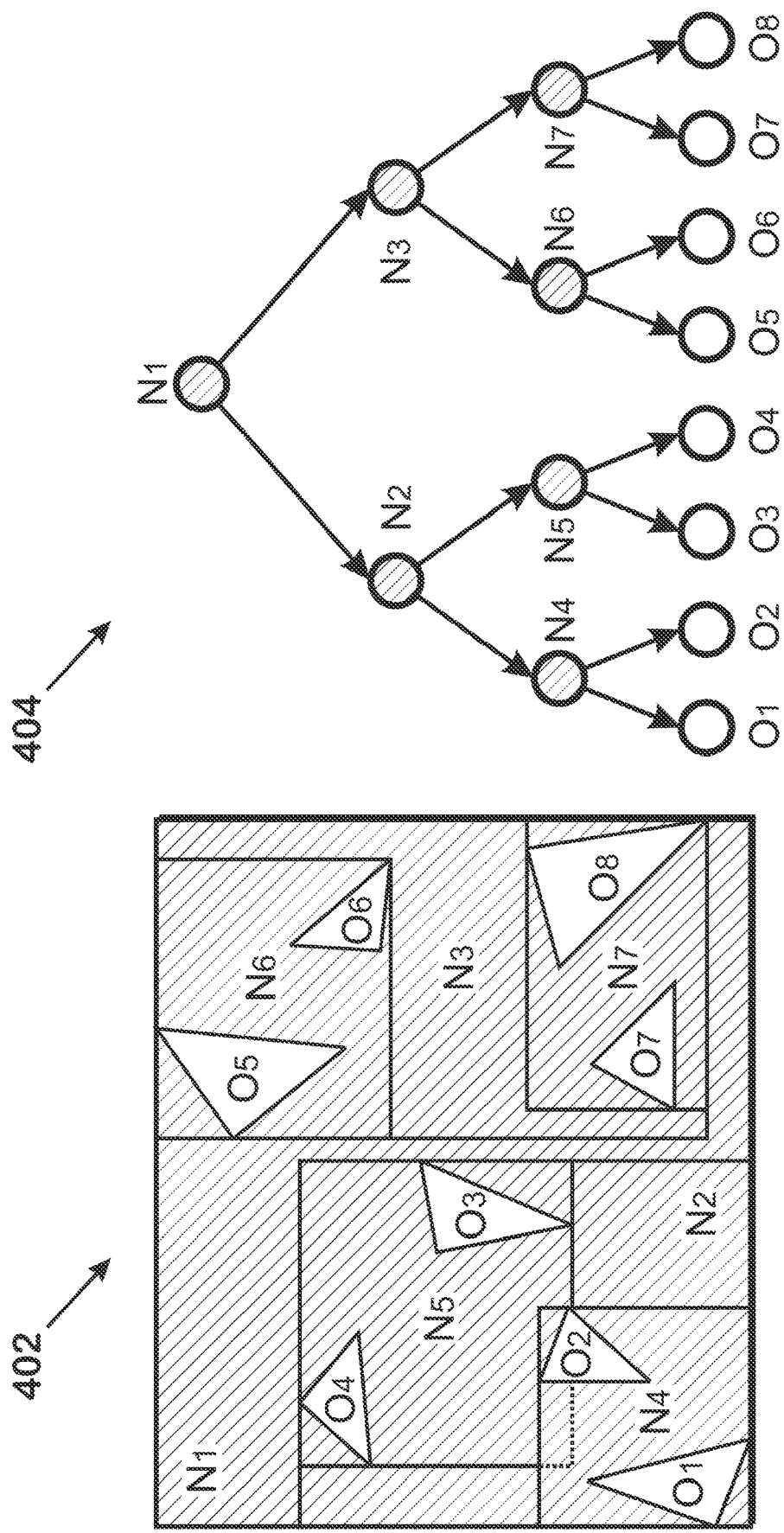
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

As described elsewhere herein, performing a ray tracing operation tests a ray for intersection with one or more triangles represented by triangle nodes of a bounding volume hierarchy. In some situations, it is possible to approximate the results of whether a ray intersects a triangle of a bounding volume hierarchy by determining whether a ray intersects a bounding box of the bounding volume hierarchy that encloses that triangle. One example of such a situation is for evaluations associated with ambient occlusion. Ambient occlusion is a technique for lighting a surface by identifying the degree to which geometry other than the surface is deemed to occlude an ambient light source. It is possible in certain situations to approximate detection of occlusion by triangles by testing for occlusion by bounding boxes that bound those triangles. As such bounding boxes are already built in to the bounding volume hierarchy, it is possible to approximate detection of intersection of a ray with triangles for the purposes of ambient occlusion by testing for the intersection of a ray with bounding boxes that bound those triangles. In the description herein, a test for whether a ray intersects such a bounding box is referred to as an "early termination ray intersection test."

Figure 5:
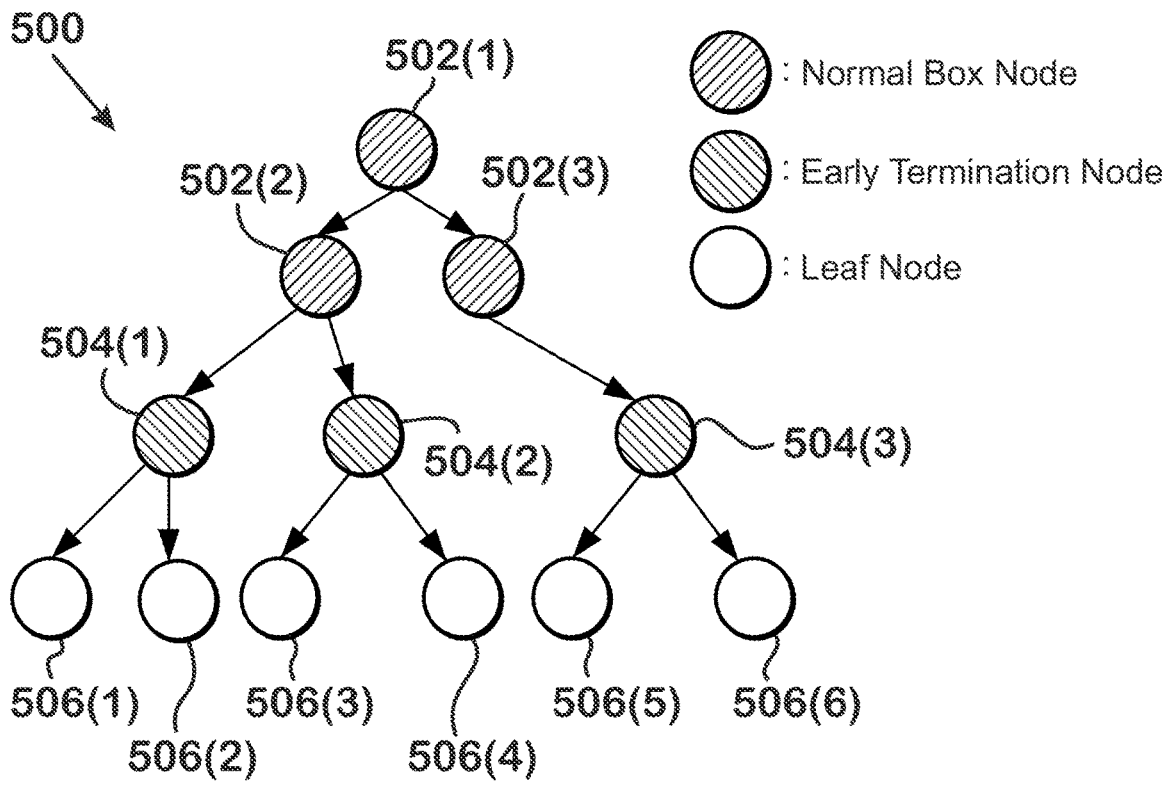
FIG. 5 is an illustration of a bounding volume hierarchy including early termination box nodes, according to an example.

FIG. 5 is an illustration of a bounding volume hierarchy ("BVH") 500 including early termination box nodes 504, according to an example. The early termination box nodes 504 are similar to the box nodes (also "non-leaf nodes N") of FIG. 4 in that the early termination box nodes 504 are associated with bounding boxes that bound the geometry associated with nodes that are children of the early termination box nodes 504. However, when performing an early termination ray intersection test for a ray, if the ray tracing pipeline 300 detects that the ray intersects with the bounding box of an early termination box node 504, the ray tracing pipeline 300 deems such an intersection to be an intersection with a triangle. (However, as described further below, in some implementations, intersections with an early termination box node 504 that are too close to the origin of the ray are not treated as intersections with triangles).

If the ray tracing pipeline 300 determines that a ray intersects the bounding box of an early termination box node 504, then the ray tracing pipeline 300 "terminates" traversal past that early termination box node 504. Note, however, that in some implementations or modes of operation, the ray tracing pipeline 300 does not fully terminate traversal of the BVH 500 even if the ray tracing pipeline 300 detects intersection of the ray with an early termination box node 504. More specifically, in some situations where untested nodes remain in the BVH 500, the ray tracing pipeline 300 proceeds to test those untested nodes. If the ray tracing pipeline 300 determines that an early termination box node 504 does not intersect with the ray, then the ray tracing pipeline 300 determines that the ray cannot intersect with any triangle within the bounding box associated with that early termination box node 504. This is similar to how "normal" box nodes of bounding volume hierarchies function.

In the example of ambient occlusion, in response to the ray tracing pipeline 300 detecting that the ray intersects the bounding box of an early termination box node 504, the ray tracing pipeline 300 determines that the ray is occluded by geometry.

For normal box nodes 502, the ray tracing pipeline 300 evaluates such nodes in the same manner as described with respect to FIG. 4. Specifically, a hit for that box node 502 results in the ray tracing pipeline 300 testing the ray for intersection with children of that node and a miss results in the ray tracing pipeline 300 removing all children of that node from consideration.

Figure 6A:
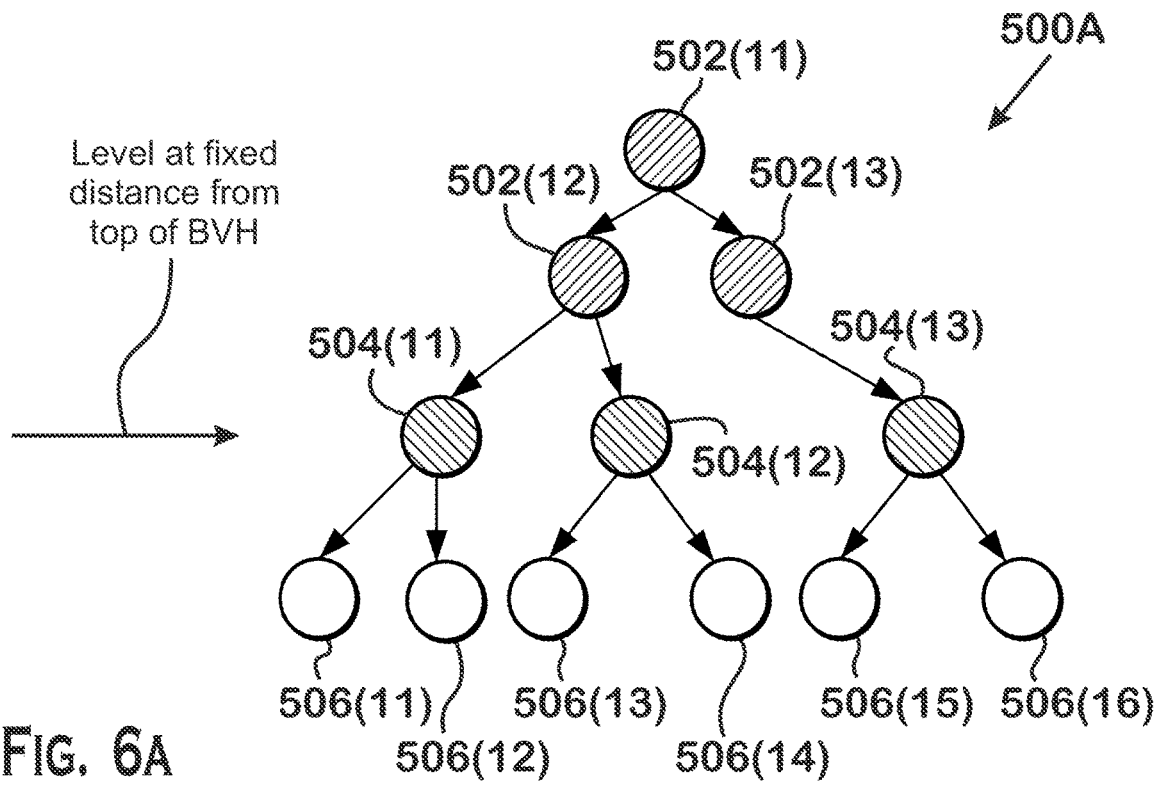
FIGS. 6A-6C illustrate several example ways in which box nodes of a bounding volume hierarchy are designated as early termination nodes.
Figure 6B:
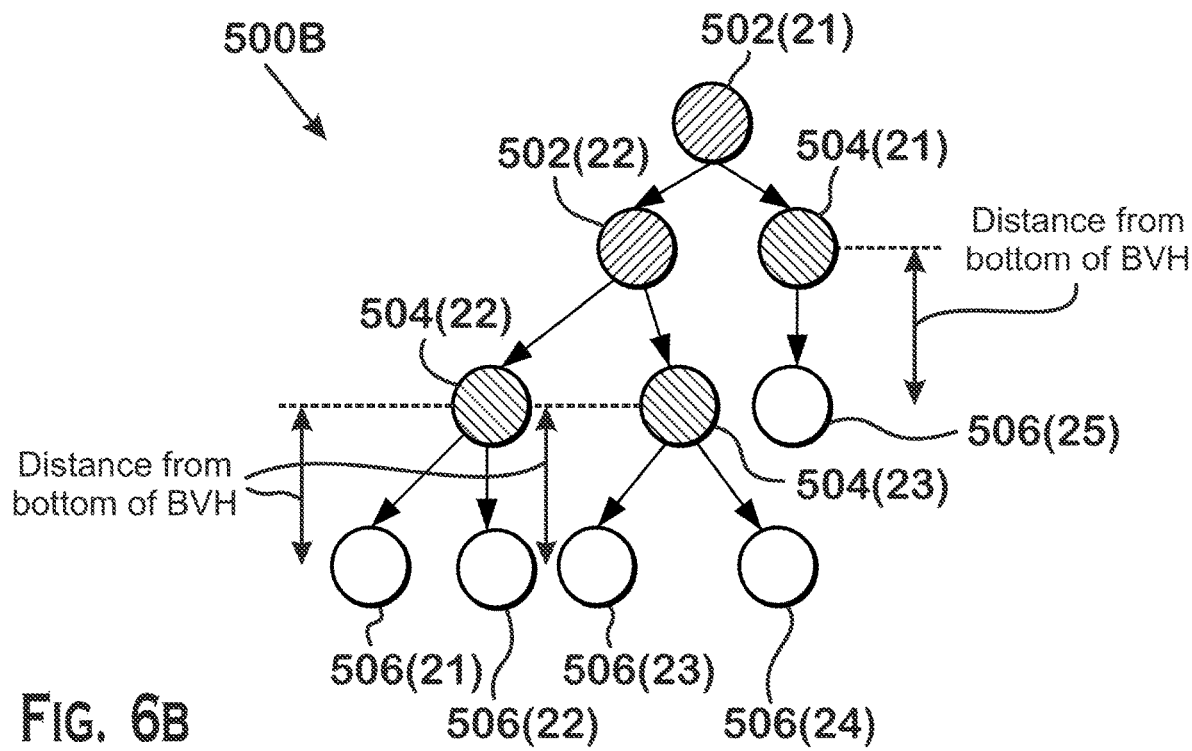
Figure 6C:
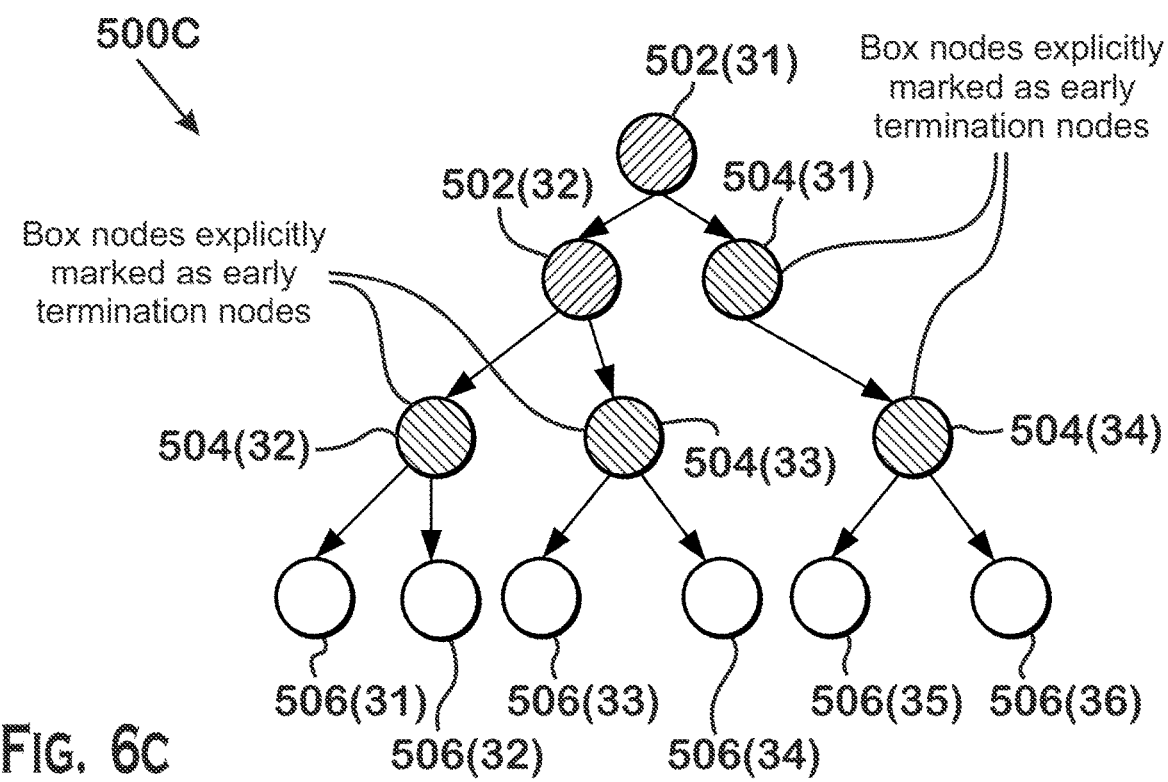

FIGS. 6A-6C illustrate several example ways in which box nodes of a bounding volume hierarchy are designated as early termination nodes.

FIG. 6A illustrates a bounding volume hierarchy 500A in which the early termination box nodes 504 are the box nodes that exist at a fixed depth from the top of the bounding volume hierarchy 500A, according to an example. In FIG. 6A, this fixed depth is two levels. However, in different implementations, any number of levels could be used.

In some implementations, the fixed depth is associated with box nodes that are of the same approximate size. Here, the term "size" refers to a measure of the size of the bounding box associated with a box node. In some implementations, this size is volume. In some implementations, this size is the smallest dimension. In some implementations, this size is the middle dimension (i.e., the dimension that is neither the smallest nor the largest). In some implementations, this size is the largest dimension.

FIG. 6B illustrates a bounding volume hierarchy 500B in which the early termination box nodes 504 are the box nodes that exist at a fixed depth from the bottom (i.e., leaf) of the bounding volume hierarchy 500B, according to an example. In FIG. 6B, this fixed depth is one level. However, in different implementations, any number of levels could be used. As with FIG. 6A, in FIG. 6B, the fixed depth is associated with box nodes that are of the same approximate size. Various examples of a description for the term "size" are provided above with respect to FIG. 6A.

FIG. 6C illustrates a bounding volume hierarchy 500C in which the early termination nodes 504 are not necessarily at any particular level, but are the box nodes for which metadata explicitly marks those box nodes as being early termination nodes 504.

In some implementations, box nodes are marked as early termination nodes 504 in the situation that the box nodes are considered a "good fit" for the triangles bounded by that box node. In some implementations, a bounding box is considered a good fit for a triangle within that bounding box if the volume occupied by the bounding box is considered to be a good approximation of the triangles within that bounding box. In some implementations, a bounding box is considered a good approximation of the triangles within the bounding box in the situation that at least one of the dimensions of the bounding box is below a certain absolute size.

FIG. 7 illustrates an illustration of a bounding box considered a "good fit" and bounding boxes considered a "bad fit," according to examples. In addition, a threshold size 706 is illustrated. Any bounding box having any dimension smaller than the threshold size 706 is considered a "good fit" bounding box 702. Any bounding box having no dimensions smaller than the threshold size 706 is considered to be a "bad fit" bounding box 704. In various implementations, the threshold size 706 is determined in any technically feasible manner, such as by an application 126, driver 122, or by a hardware or software entity executing within the APD 116.

Three "good fit" bounding boxes 702 are illustrated. A first good fit bounding box 702(1) has a horizontal dimension smaller than the threshold size 706. It can be seen that this good fit bounding box 702(1) approximates the space occupied by the triangle 706(1) enclosed therein to a good degree. Similarly, the good fit bounding box 706(2) has at least one dimension smaller than the threshold size 706. Again, it can be seen that this bounding box 706(2) approximates the space occupied by the triangle 706(2). A third good fit bounding box 706(3) has at least two dimensions smaller than the threshold size 706 and is thus also considered a good fit bounding box 702. A "bad fit" bounding box 704 has no dimensions smaller than the threshold size 706, which is why that bounding box is classified as a "bad fit" bounding box.

In different implementations, different entities determine whether a particular bounding box is considered a good fit. In some implementations, an entity that generates the bounding volume hierarchy determines whether the boxes of the bounding volume hierarchy are a good fit. In some implementations, this entity is a compiler or other software tool available at compile time to generate an executable from code and to create the bounding volume hierarchy from a scene created by a software developer. In some implementations, this entity is a software or hardware entity that evaluates a bounding volume hierarchy at runtime. In some examples, such an entity is the driver 122, an application 126, a shader program executing on a compute unit 132, or another hardware or software entity in the processor 102, APD 116, or elsewhere.

As described herein, in some implementations, a ray is deemed to intersect geometry for the purpose of an early termination ray intersection test in the case that a ray intersection test determines that the ray intersects an early termination box node 504. In some implementations, the ray tracing pipeline 300 rejects such intersections that are within a proximal volume associated with the point of origin of the ray. More specifically, the error in the box-related approximation to the triangle-based "ground truth" geometry is amplified for bounding boxes that are sufficiently close to the point of origin of the ray being tested. For this reason, the ray tracing pipeline 300 does not treat an intersection with an early termination box node 504 within a proximal volume as an intersection with geometry that terminates the ray tracing operation. Instead, the ray tracing pipeline 300 treats such an intersection as if the early termination box node 504 were a normal box node 502. Thus the ray tracing pipeline 300 continues traversal of the BVH 500 below such a box node in the event of an intersection of the ray with the box node.

Figure 8A:
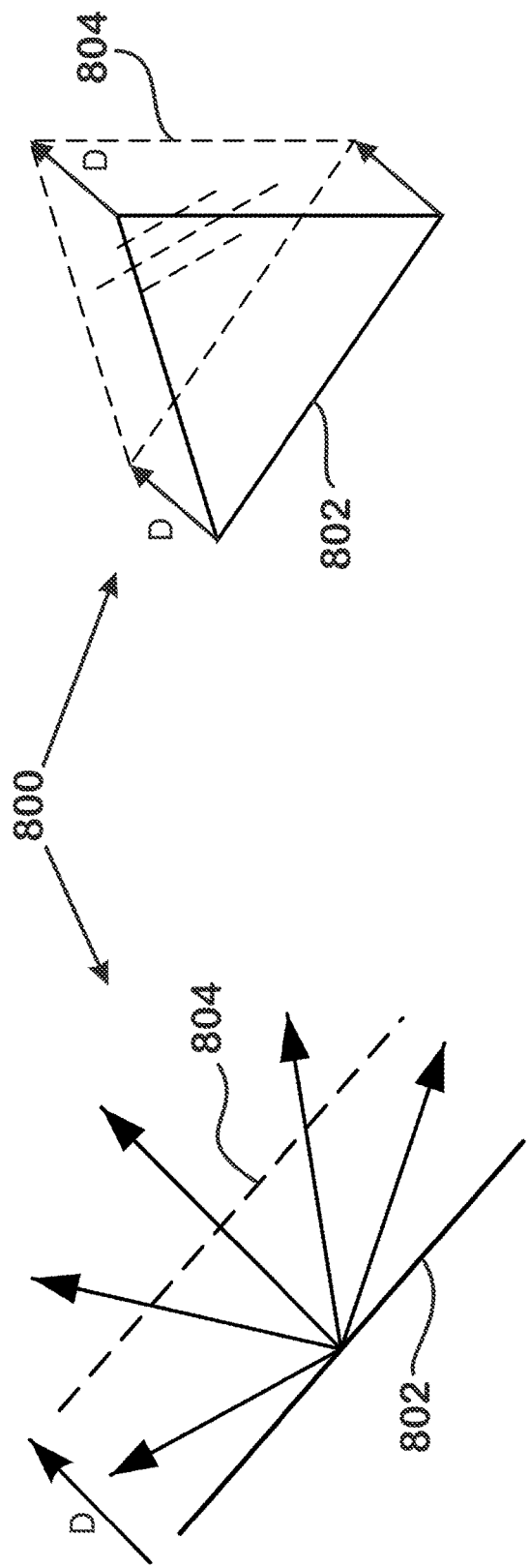
FIGS. 8A and 8B illustrate two example proximal volumes.
Figure 8B:
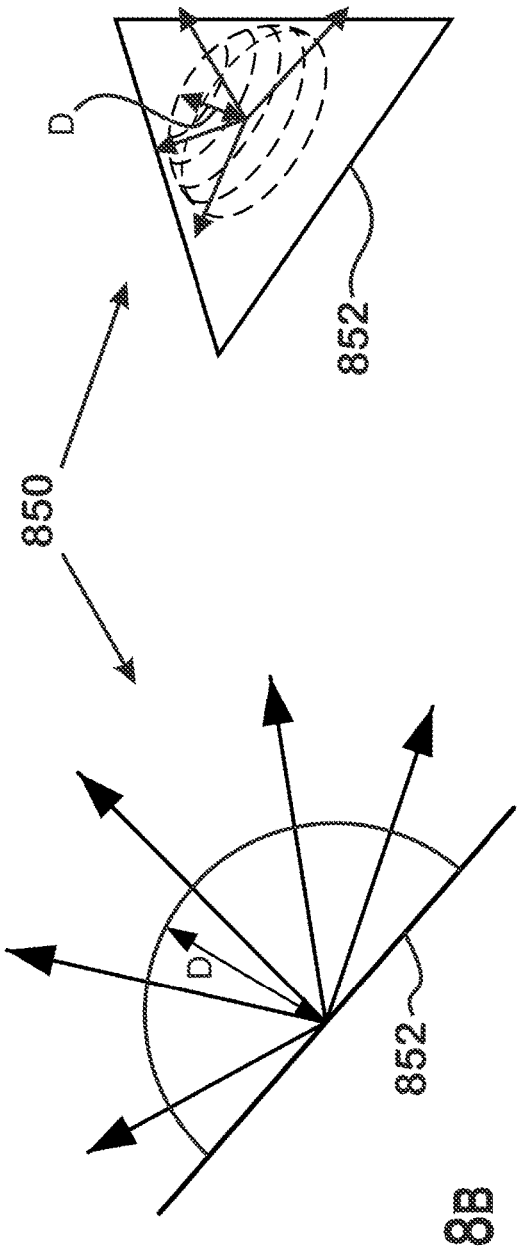

FIGS. 8A and 8B illustrate two example proximal volumes. FIG. 8A illustrates a triangular prism proximal volume 800. The triangular prism proximal volume 800 is defined as the volume between the triangle 802 from which the ray originates and a triangle displaced a certain distance D from the triangle 802. The distance D can be set in any technically feasible manner. The ray tracing pipeline 300 treats an intersection with an early termination box node 504 within the proximal volume 800 shown as an intersection with a normal box node 502, as described elsewhere herein.

FIG. 8B illustrates a semi-spherical proximal volume 850. This semi-spherical proximal volume 850 is defined by a distance (radius) from the origin of the ray. Again, ray tracing pipeline 300 treats an intersection with an early termination box node 504 within the proximal volume 850 shown as an intersection with a normal box node 502, as described elsewhere herein.

Figure 9:
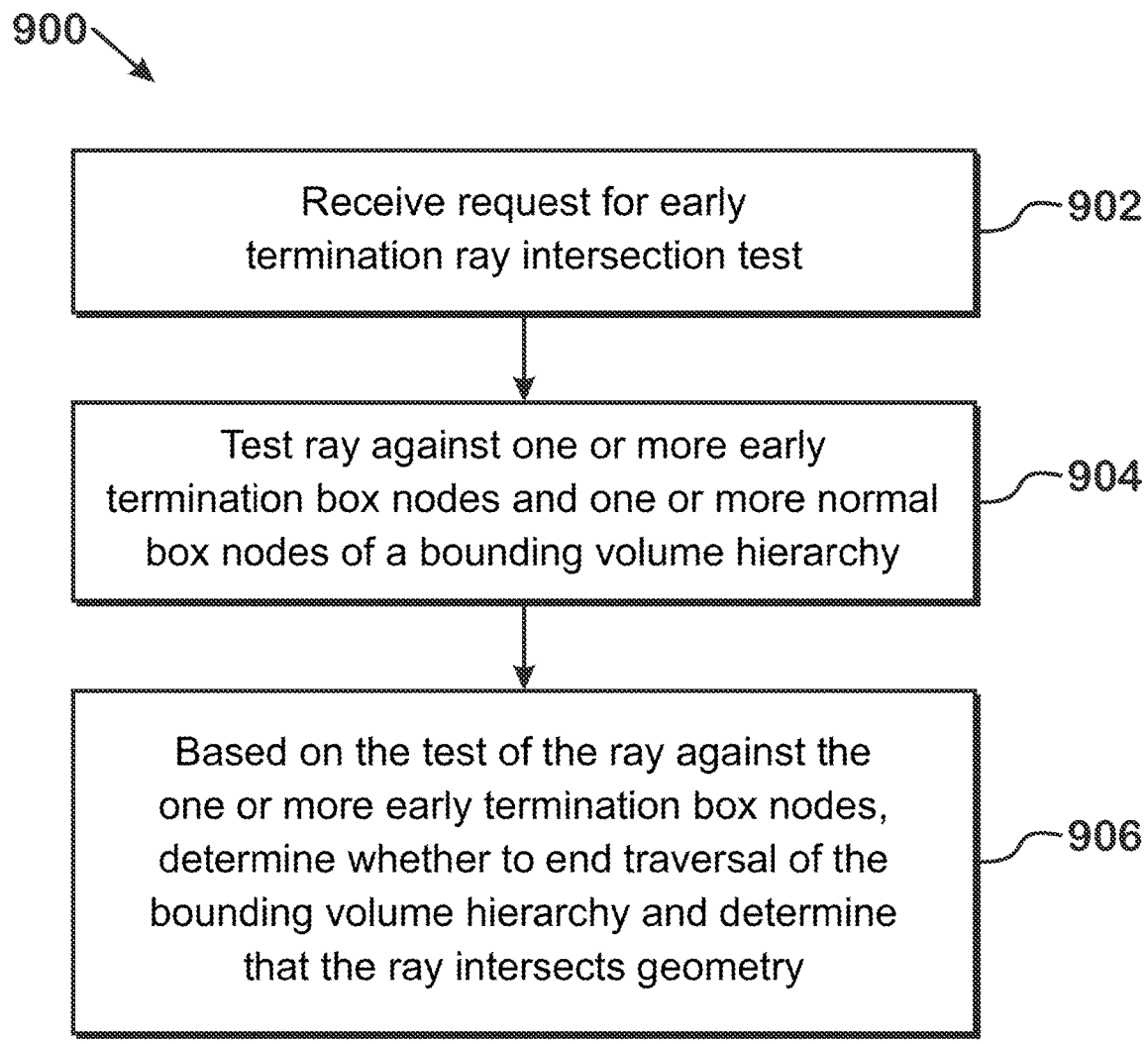
FIG. 9 is a flow diagram of a method for performing an early termination ray intersection test, according to an example.

FIG. 9 is a flow diagram of a method 900 for performing an early termination ray intersection test, according to an example. As described elsewhere herein, an early termination ray intersection test is a test for whether a ray intersects any geometry (e.g., triangles) represented in a bounding volume hierarchy. The early termination ray intersection test exhibits the feature that the test "exits early" upon detecting that the ray intersects an early termination box node, where such intersection is not rejected for other reasons, such as due to being too close to the point of origin of the ray or the surface on which that point of origin lies. In the instance that the ray intersects an early termination box node and that intersection is not rejected, the ray tracing pipeline 300 determines that the ray does intersect with any geometry represented in the bounding volume hierarchy.

The method 900 begins at step 902, where the ray tracing pipeline 300 (in some examples, the acceleration structure traversal stage 304 performs some or all operations for FIG. 9 described as being performed by the ray tracing pipeline 300) receives a request for an early termination ray intersection test. The request specifies a ray (for example, by origin point and direction) to test against the geometry of a scene as reflected in a bounding volume hierarchy.

In some examples, the request is part of an ambient occlusion test. In the ambient occlusion test, an ambient occlusion test requester (which can be software such as a shader program executing on the compute units 132, hardware, or a combination of software and hardware) requests an ambient occlusion factor to be calculated for a point on a surface by shooting a plurality of rays from the point at different directions and determining what percentage of those rays intersect any geometry. The ambient occlusion test requester then uses the ambient occlusion factor to light the point on the surface, such as by increasing the lighting of the point for an ambient occlusion factor where fewer rays intersect geometry or by decreasing the lighting of the point for an ambient occlusion factor where more rays intersect geometry.

At step 904, the ray tracing pipeline 300 tests the ray against one or more early termination box nodes 504 and against one or more normal box nodes 502 of a bounding volume hierarchy 500. As stated elsewhere herein, for a normal box node 502, the ray tracing pipeline 300 eliminates from consideration children of such nodes if the ray does not intersect such nodes. If the ray intersects a normal box node 502, then the ray tracing pipeline 300 tests children of that node for intersection with the ray.

At step 906, based on a test of the ray against one or more early termination box nodes 504, the ray tracing pipeline 300 determines whether to end traversal of the bounding volume hierarchy and determine that the ray intersects geometry. In some implementations, the ray tracing pipeline 300 determines that the ray intersects geometry if the ray intersects an early termination box node 504. In such situations, the ray tracing pipeline 300 ends traversal of the bounding volume hierarchy and determines that the ray intersects geometry for the purpose of the early termination ray intersection test. However, in some implementations, if the point of intersection with an early termination box node 504 is within a proximal area associated with the origin of the ray, then the ray tracing pipeline treats such intersections as an intersection with a normal box node 502.

It is possible for the ray tracing pipeline 300 to test the ray against triangles, even where the bounding volume hierarchy includes at least one early termination box nodes 504. An intersection with a triangle means that the ray intersects geometry, and the traversal of the bounding volume hierarchy is terminated. If the ray does not intersect a triangle, then the ray tracing pipeline 300 continues traversal of the bounding volume hierarchy.

Each of the units illustrated in the figures represent hardware circuitry configured to perform the operations described herein, software configured to perform the operations described herein, or a combination of software and hardware configured to perform the steps described herein. For example, the acceleration structure traversal stage 304 is implemented fully in hardware, fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware. Where a particular stage of the ray tracing pipeline 300 is said to be "invoked," this invocation involves performing the functionality of the hardware if the stage is implemented as hardware circuitry or executing a shader program (or other software) if the stage is implemented as a shader program that executes on a processor.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing a ray intersection test, the method comprising:
   receiving a request for an early termination ray intersection test for a ray;
   testing the ray against one or more early termination box nodes and one or more normal box nodes of a bounding volume hierarchy; and
   based on the test of the ray against the one or more early termination box nodes, determining whether to end traversal of the bounding volume hierarchy and determine whether the ray intersects geometry for the purpose of the ray intersection test.

2. The method of claim 1, wherein determining whether to end traversal and whether the ray intersects geometry comprises:
responsive to determining that the ray intersects an early termination box node, determining that the ray intersects geometry and stopping traversal of the bounding volume hierarchy.

3. The method of claim 1, wherein determining whether to end traversal and whether the ray intersects geometry comprises:
responsive to determining that the ray does not intersect an early termination box node, removing from consideration children of the early termination box node.

4. The method of claim 1, wherein:
the one or more early termination box nodes are associated with boxes considered to be will-fit to underlying geometry.

5. The method of claim 4, wherein:
boxes that are well-fit to underlying geometry have at least one dimension that is below a threshold.

6. The method of claim 1, further comprising:
repeating the receiving, testing, and determining steps a plurality of times for a plurality of rays to obtain an ambient occlusion factor.

7. The method of claim 6, wherein the ambient occlusion factor reflects a percentage of rays of the plurality of rays that are deemed to intersect geometry.

8. The method of claim 1, wherein:
determining whether to end traversal of the bounding volume hierarchy and determine whether the ray intersects geometry for the purpose of the ray intersection test comprises: responsive to determining that the ray intersects an early intersection box node within a proximal volume, continuing traversal past the early termination box node.

9. The method of claim 8, wherein the proximal volume comprises one of a triangular prism and a semisphere.

10. A device for performing a ray intersection test, the device comprising:
a processor; and
a memory configured to store at least a portion of a bounding volume hierarchy,
wherein the processor is configured to:
receive a request for an early termination ray intersection test for a ray;
test the ray against one or more early termination box nodes and one or more normal box nodes of the bounding volume hierarchy; and
based on the test of the ray against the one or more early termination box nodes, determine whether to end traversal of the bounding volume hierarchy and determine whether the ray intersects geometry for the purpose of the ray intersection test.

11. The device of claim 10, wherein determining whether to end traversal and whether the ray intersects geometry comprises:
responsive to determining that the ray intersects an early termination box node, determining that the ray intersects geometry and stopping traversal of the bounding volume hierarchy.

12. The device of claim 10, wherein determining whether to end traversal and whether the ray intersects geometry comprises:
responsive to determining that the ray does not intersect an early termination box node, removing from consideration children of the early termination box node.

13. The device of claim 10, wherein:
the one or more early termination box nodes are associated with boxes considered to be will-fit to underlying geometry.

14. The device of claim 13, wherein:
boxes that are well-fit to underlying geometry have at least one dimension that is below a threshold.

15. The device of claim 10, wherein the processor is further configured to:
repeat the receiving, testing, and determining steps a plurality of times for a plurality of rays to obtain an ambient occlusion factor.

16. The device of claim 15, wherein the ambient occlusion factor reflects a percentage of rays of the plurality of rays that are deemed to intersect geometry.

17. The device of claim 10, wherein:
determining whether to end traversal of the bounding volume hierarchy and determine whether the ray intersects geometry for the purpose of the ray intersection test comprises: responsive to determining that the ray intersects an early intersection box node within a proximal volume, continuing traversal past the early termination box node.

18. The device of claim 17, wherein the proximal volume comprises one of a triangular prism and a semisphere.

19. A non-transitory computer-readable medium storing instructions that, when executed by a processor, cause the processor to perform a ray intersection test, by:
receiving a request for an early termination ray intersection test for a ray;
testing the ray against one or more early termination box nodes and one or more normal box nodes of a bounding volume hierarchy; and
based on the test of the ray against the one or more early termination box nodes, determining whether to end traversal of the bounding volume hierarchy and determine whether the ray intersects geometry for the purpose of the ray intersection test.

20. The non-transitory computer-readable medium of claim 19, wherein determining whether to end traversal and whether the ray intersects geometry comprises:
responsive to determining that the ray intersects an early termination box node, determining that the ray intersects geometry and stopping traversal of the bounding volume hierarchy.

* * * * *